(No Model.)

C. W. ALLEN.
FIFTH WHEEL.

No. 304,155. Patented Aug. 26, 1884.

WITNESSES:
Dom Twitchell
C. Sedgwick

INVENTOR:
C. W. Allen
BY Munn & Co
ATTORNEYS.

UNITED STATES PATENT OFFICE.

CHARLES WESLEY ALLEN, OF VALENTINE, NEBRASKA, ASSIGNOR OF THREE-FOURTHS TO CHARLES H. CORNELL AND JASON P. WOOD, BOTH OF SAME PLACE.

FIFTH-WHEEL.

SPECIFICATION forming part of Letters Patent No. 304,155, dated August 26, 1884.

Application filed April 14, 1884. (No model.)

*To all whom it may concern:*

Be it known that I, CHARLES W. ALLEN, of Valentine, in the county of Cherry and State of Nebraska, have invented a new and Improved Fifth-Wheel, of which the following is a full, clear, and exact description.

The object of this invention is to improve the construction of the fifth-wheel of vehicles.

The invention consists in the fifth-wheel for a vehicle, composed of a cup or semi-spherical socket adapted to be attached upon the upper side of the axle, and of a hemispherical block or half-ball fitting in said cup and adapted to be secured to the under side of the sand-bar or forward spring-bar of a vehicle.

The invention further consists in a safety-brace attached to the reach and extending beneath the axle, as will be hereinafter more particularly set forth.

Reference is to be had to the accompanying drawings, forming a part of this specification, in which similar letters of reference indicate corresponding parts in both the figures.

Figure 1:
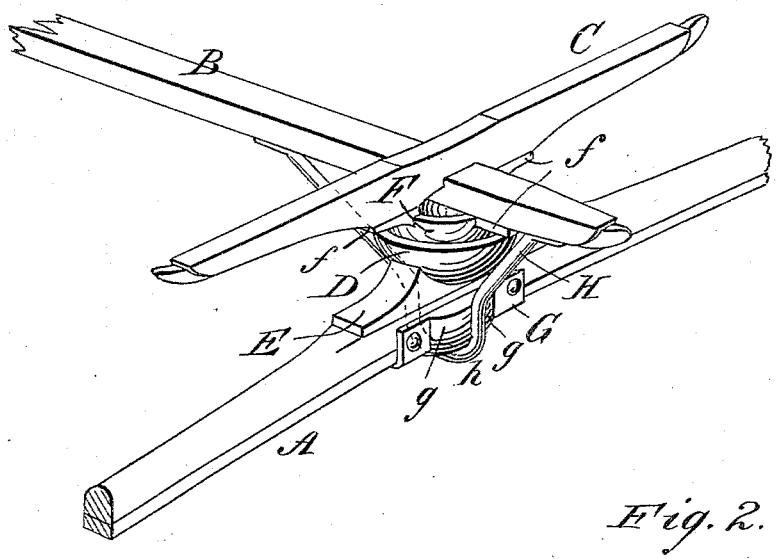
Figure 2:
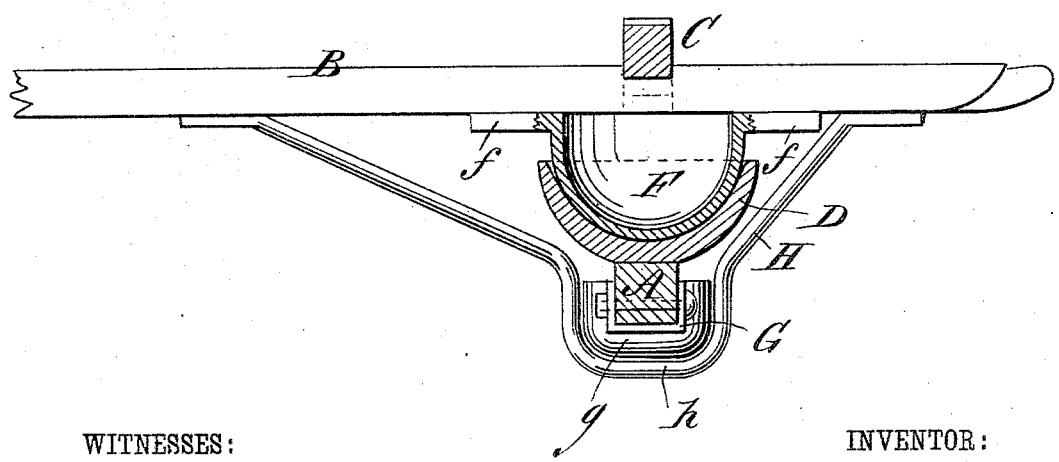

Figure 1 is a perspective view of a portion of the running-gear of a wagon having my improved fifth-wheel applied thereto, and Fig. 2 is a longitudinal sectional elevation of the same.

A indicates the axle in part, B the reach, and C the sand-board or spring-bar, of a wagon.

D is a cup or hemispherical socket attached to or made integral with a suitable plate, E, for its secure attachment upon the upper side of the axle.

F is a hollow-shaped block or half-ball, adapted by suitable wings, $f$, for attachment upon the under side of the sand-board and reach; or it may be otherwise attached, as circumstances may require, which block or half-ball is fitted to move freely in the cup D.

To the under side of the axle is secured a wear-plate, G, extending over the bottom and sides of the central portion of the axle, and having a convex enlargement, $g$, upon the three sides, as shown.

Attached to the end of the reach, which extends forward of the fifth-wheel, is a safety-brace, H, which extends downwardly and rearwardly to the top of the wear-plate G, and thence by a substantially-semicircular loop, $h$, beneath the axle and wear-plate, and then upwardly and rearwardly to the reach again, to which it is securely bolted, the connecting of the enlargement $g$ of the wear-plate being such that when the axle swings horizontally or vertically the loop $h$ will keep the half-ball F to place in the cup D.

This improved fifth-wheel permits a free swinging movement of the axle upon its center in any direction, and all strain is taken from the spring. There is no king-bolt, and the draft-strain is equally distributed upon the axle, reach, and sand-board or spring-bar. When one of the forward wheels is raised in passing over an obstruction or lowered by running into a hollow, the forward part of the vehicle retains its equilibrium.

This fifth-wheel is adapted to any vehicle, but more particularly to light wagons and buggies.

I am aware that a fifth-wheel composed of semi-spherical block fitting in a cup and forming a ball-and-socket bearing is old, and I therefore do not claim such invention.

Having thus described my invention, I claim as new and desire to secure by Letters Patent—

The combination, with the axle A, the reach B, and the spring-bar C, of the cup D, the hemispherical block F, the wearing-plate $g$, and the brace H, having its ends secured to the reach, substantially as herein shown and described.

CHARLES WESLEY ALLEN.

Witnesses:
R. E. BOWDEN,
ROBERT LUCAS.